(12) United States Patent
Takahashi (10) Patent No.: US 6,499,784 B2
(45) Date of Patent: Dec. 31, 2002

(54) ARTICLE STORAGE DEVICE OF MOTORCYCLE

(75) Inventor: Akihiko Takahashi, Hamamatsu (JP)

(73) Assignee: Suzuki Kabushiki Kaisha, Hamamatsu (JP)

( * ) Notice: Subject to any disclaimer, the term of this patent is extended or adjusted under 35 U.S.C. 154(b) by 0 days.

(21) Appl. No.: 09/884,980

(22) Filed: Jun. 21, 2001

(65) Prior Publication Data

US 2002/0008397 A1 Jan. 24, 2002

(30) Foreign Application Priority Data

Jun. 23, 2000 (JP) .......................................... 2000-190327
May 22, 2001 (JP) .......................................... 2001-152863

(51) Int. Cl.$^7$ ................................................. B62J 9/00
(52) U.S. Cl. ........................ 296/37.1; 224/413; 224/433
(58) Field of Search ........................ 296/37.1, 37.16, 296/37.15; 180/219; 224/275, 412, 413, 418, 427, 428, 435, 419, 433

(56) References Cited

U.S. PATENT DOCUMENTS

| | | | | |
|---|---|---|---|---|
| 4,697,664 A | * | 10/1987 | Kohyama ..................... | 180/226 |
| 4,800,980 A | * | 1/1989 | Hideo et al. ............. | 296/37.16 |
| 4,964,483 A | * | 10/1990 | Yokoyama et al. ......... | 180/219 |
| 5,040,632 A | * | 8/1991 | Fujii et al. ................. | 180/219 |
| 5,094,315 A | * | 3/1992 | Taki et al. .................... | 180/219 |
| 5,433,286 A | * | 7/1995 | Kumamaru et al. ........ | 180/219 |
| 6,073,719 A | * | 6/2000 | Ohmika et al. ............. | 180/219 |
| 6,336,579 B1 | * | 1/2002 | Sako ........................... | 224/413 |
| 6,357,542 B1 | * | 3/2002 | Sako .......................... | 296/37.1 |

\* cited by examiner

Primary Examiner—D. Glenn Dayoan
Assistant Examiner—G Blankenship
(74) Attorney, Agent, or Firm—Oblon, Spivak, McClelland, Maier & Neustadt, P.C.

(57) ABSTRACT

In a motorcycle, a seat member includes a rider seat section and a pillion section which is continuous to a rear portion of the rider seat section and the article storage device is arranged below the seat member. The article storage device comprises an article storage box as a body of the storage device disposed below the seat member and an article access port formed to the article storage box and opened upward in an installed state of the storage box. A recessed portion protruding upward is formed at a central portion of a bottom surface of the article storage box, the bottom surface has a front side portion in front of a top portion of the recessed portion is inclined forward downward and the bottom surface also has a rear portion at the rear of the top portion of the recessed portion inclined rearward downward. The article access port has a rear edge portion positioned at the rear of the top portion of the recessed portion.

27 Claims, 10 Drawing Sheets

ARTICLE STORAGE DEVICE OF MOTORCYCLE

BACKGROUND OF THE INVENTION

The present invention relates to an article storage device of a motorcycle.

In a motorcycle, particularly, of a scooter type, an article storage device or compartment of box structure having a large capacity capable of storing or accommodating a large article such as a helmet or the like is provided below a seat formed so as to be opened and closed. As conventional examples of an article storage device (or box) of the type mentioned above, there are, for example, structures shown in Japanese Patent Laid-Open Publication No. HEI 1-148679, Japanese Utility Model Laid-Open Publication No. HEI 1-58388 and Japanese Patent Laid-Open Publication No. HEI 6-156344.

In such conventional examples, the article storage box disposed below the seat is formed of synthetic resin in shape of a bottomed container having an article access port opened above, and the storage box is provided with an article access port having an opening area which is equal to or more than an area of a bottom surface of the storage box so as to provide a taper shape narrowed in the whole structure towards the lower portion thereof. This is because of intending to make simple a die to be used and improve a draft property at a time of forming the storage box, as well as to enable the storage boxes to be stacked, and hence, improve a transferring efficiency thereof.

However, in a scooter type motorcycle, independent frame covers are provided in both sides of the article storage box, and each of the frame covers is formed so as to be expanded in a width direction towards the lower portion thereof in order to cover both side portions of a power unit installed below the storage box in a standing attitude. Therefore, an unnecessary dead space is formed between the storage box having a taper shape narrowing towards the lower portion and the frame cover having the width expanded towards the lower portion. Furthermore, the dead space will be easily formed in front of and at the rear of the storage box, and hence, the article storage box is made small in storing capacity in comparison with an outer appearance.

Furthermore, in order to accommodate a helmet or like article in the storage box, it is necessary to align the bottom surface area of the storage box with a size of the helmet. However, since the storage box is formed in the downward narrowed taper shape, an opening area of the article access port becomes larger than the size of the helmet, and it is unavoidable that the seat closing the article access port becomes necessarily large scaled, so that not only a sitting feeling (a step-over easiness) and a foot placing property of a rider and a passenger are deteriorated, but also a design of the motorcycle will be damaged.

On the contrary, in the case of increasing the capacity of the article storage box, in particular, increasing a longitudinal size of the storage box so as to make it possible to accommodate or store an article having a long size or scale such as tennis racket or umbrella, it is hard to place the helmet and the other small articles at a fixed position within the storage box, thus providing another disadvantage such that these articles roll within the storage box and the article itself and an interior portion of the storage box will be damaged.

In such case, a hook or the like member may be provided within the storage box to prevent the article, such as the helmet or the like, from rolling and the article is fastened and fixed by using a rope, a net or the like. However, in the case of storing a large article, there is a fear that the hook protruding in the storage box damages the article.

SUMMARY OF THE INVENTION

An object of the present invention is to substantially eliminate defects or drawbacks encountered in the prior art mentioned above and to provide an article storage device of a motorcycle capable of effectively utilizing a dead space in an interior portion of a motorcycle (vehicle) body and improving a productivity of an article storage box while maintaining an increased capacity of the storage box without deteriorating a sitting feeling and a foot placing property of a rider and a passenger.

Another object of the present invention is to provide an article storage device of a motorcycle capable of preventing an article such as helmet, small article and the like from rolling within the storage box and accommodating a long article such as umbrella while making it easy to access the article, as well as safely forming a hook within the storage box.

The above and other objects can be achieved according to the present invention by providing, in one aspect, an article storage device of a motorcycle in which a seat member has a structure including a rider seat section and a pillion section which is continuous to a rear portion of the rider seat section and the article storage device is arranged below the seat member, the article storage device comprising:

an article storage box as a body of the storage device disposed below the seat member; and an article access port formed to the article storage box and opened upward in an installed state of the storage box, the article access port being opened and closed by opening and closing the seat member, wherein the article storage box is arranged to a rear portion of a vehicle body of the motorcycle and above a rear wheel, a recessed portion protruding upward is formed at a central portion of a bottom surface of the article storage box for preventing an interference with the rear wheel, the bottom surface has a front side portion in front of a top portion of the recessed portion inclined forward downward, the bottom surface also has a rear portion at the rear of the top portion of the recessed portion inclined rearward downward, and the article access port has a rear edge portion positioned at the rear of the top portion of the recessed portion.

In accordance with the structure mentioned above, the bottom surface of the storage box is formed to provide a recessed portion (shape), an interior portion of the storage box is separated into a front half portion and a rear half portion on the boundary of the top portion of the recessed portion, and the article such as helmet, small article and the like respectively accommodated in the front half portion and the rear half portion are prevented from rolling in a longitudinal direction due to the location of the recessed portion. Further, since the article access port is opened rearward from the top portion of the recessed shape, it becomes easy to access the article accommodated in the rear half portion of the storage box.

In another aspect of the present invention, there is provided an article storage device of a motorcycle in which a seat member has a structure including a rider seat section and a pillion section which is continuous to a rear portion of the rider seat section and the article storage device is arranged below the seat member, the article storage device comprising:

an article storage box as a body of the storage device disposed below the seat member; and an article access port formed to the article storage box and opened upward in an installed state of the storage box, the article access port being opened and closed by opening and closing the seat member, wherein the article storage box has an inner shape so that front side and rear side two full-faced helmets are longitudinally arranged in a state of directing upper portions thereof upward, the two helmets are respectively accommodated so as to direct, in attitudes, a bottom edge portion forward downward and direct bottom edge portions thereof rearward downward and the rear edge portion of the article access port is positioned so that at least a front portion of the rear side helmet faces an external portion.

In accordance with the structure mentioned above, since the front and rear two helmets are accommodated within the storage box in the state of directing the bottom edge portion downward, the front side helmet and the rear side helmet are respectively accommodated within the article storage box in the forward tilted attitude and the backward tilted attitude, it is possible to effectively prevent each of the helmets from rolling and to reduce a height of the storage box, that is, a height of the seat so as to improve a sitting feeling and a foot placing property of a passenger, and the rear side helmet can be easily accessed.

In a further aspect of the present invention, there is provided an article storage device of a motorcycle in which a seat member has a structure including a rider seat section and a pillion section which is continuous to a rear portion of the rider seat section and the article storage device is arranged below the seat member, the article storage device comprising:

an article storage box as a body of the storage device disposed below the seat member; and an article access port formed to the article storage box and opened upward in an installed state of the storage box, the article access port being opened and closed by opening and closing the seat member, wherein the article storage box comprises an upper box half body having the article access port and a joint opening portion opened downward and a lower box half body having a bottom surface and a joint opening portion opened upward and the respective joint opening portions are aligned and bonded with each other, the upper box half body is formed in a shape expanding downward towards the joint opening portion from the article access port, the lower box half body is formed in a shape expanding upward towards the joint opening portion from the bottom surface, and an opening area of each of the joint opening portions is made larger than an opening area of the article access port and an area of the bottom surface of the article storage box.

In accordance with the structure mentioned above, no dead space is formed between the storage box and frame covers attached to both sides thereof and in front and at the rear of the storage box, and a capacity of the storage box can be increased. Furthermore, since the article access port is not expanded in correspondence to an increase of capacity of the storage box, it is possible to prevent the size of the seat from being increased and it is possible to improve a sitting feeling and a foot placing property of a rider and a passenger. Moreover, a productivity of the storage box can be improved.

In preferred embodiments of the above aspects, the joint opening portions of the upper and lower box half bodies are formed with engaging flanges so as to protrude towards outer peripheral sides thereof, and the upper and lower box half bodies are integrally assembled by mating and bonding the upper and lower engaging flanges to each other and then gripping and fixing the same from the outer peripheral side thereof by means of a clamp member.

The pillion section is connected to the rear portion of the rider seat section to be higher by one stage and the article storage box is arranged below the pillion section, a protruding portion is formed to a front end portion of the article storage box so as to extend downward of the rider seat section, and a lid member for separating an interior space of the protruding portion from another space in the article storage box is formed therein so as to be opened and closed.

The lid member is provided to be independent from the article storage box and an article holding portion for holding the article in the protruding portion is integrally formed to the lid member.

The article storage box is formed with an expanded portion at a rearmost portion of the article storage box in a longitudinal direction thereof so as to protrude outside the rear edge portion of the article access port.

The interior of the article storage box is divided into a front half portion and a rear half portion so as to accommodate two full-faced helmets respectively in a state of directing top portions thereof upward, and an upper portion of at least the rear side helmet is pressed by the bottom plate of the seat member.

The interior of the article storage box is divided into a front half portion and a rear half portion so as to accommodate two full-faced helmets respectively in a state of directing top portions thereof upward, the respective helmets are defined in attitudes so that the front side helmet is directed forward the pillion section in a state that a vertical axis thereof is inclined forward and the rear side helmet is directed rearward the pillion section in a state that a vertical axis thereof is inclined rearward, and a height of a portion of the pillion section corresponding to a portion above a valley-like space formed between the front and rear helmets in a side view of the bottom plate of the pillion section is made lower than a height of a portion corresponding to a portion above the top portions of the front and rear helmets.

A plurality of recesses for accommodating hooks are formed to the bottom surface of the article storage box, the hooks are placed in the hook accommodation recesses, and a height of the hooks is equal to or lower than a height of the bottom surface of the article storage box. The hook is provided to be rotatable between an upright position and a tilt-down position thereof in the hook accommodation recess, to protrude from the bottom surface of the article storage box at an upright position and to retract below the bottom surface of the article storage box at a tilt-down position.

According to the above preferred embodiments, in addition that a bonding structure and a bonding operation between the joint opening portions of the upper and lower box half bodies can be made simple, the bonding portions are made compact so as to be useful for increasing a capacity of the storage box.

It is possible to effectively use the dead space, and the small article can be held and prevented from rolling by providing the protruding portion to the storage box and the lid member in the front end of the storage box. The long scaled article can be also accommodated by opening the lid member. Furthermore, the article storage box can be effectively formed and assembled.

The capacity of the storage box can be increased by utilizing the dead space formed in the rear portion of the storage box in the conventional structure as a usable storage space. Further, the article access port does not become large.

Still furthermore, it is possible to securely position the rear side helmet in cooperation with a rearward downward inclination of the bottom surface of the bottom portion of the storage box.

It is also possible to reduce the height of the pillion seat, increase a cushioning capacity (thickness) of the pillion seat and improve a sitting feeling and a riding quality of a passenger by longitudinally inclining the vertical axial directions of two helmets received in front and at the rear of the interior portion of the storage box.

Furthermore, there is no fear that the hooks get in the way at a non-use time of the hook, and the article is damaged, and it is possible to secure a large capacity of the storage box by making shallow the depth of the hook storage recess portion.

The nature and further characteristic features of the present invention will be made more clear from the following descriptions made with reference to the accompanying drawings.

DESCRIPTION OF THE PREFERRED EMBODIMENTS

One preferred embodiment of the present invention will be described hereunder with reference to the accompanying drawings.

First, it is to be noted that the terms "upper", "lower" and the like are used herein in the assumption of the motorcycle being in an installed state or in an illustrated state and the terms "forward", "rearward" and the like are used herein in an illustrated state or such that a front wheel side is "forward" and a rear wheel side is "rearward".

Figure 1:
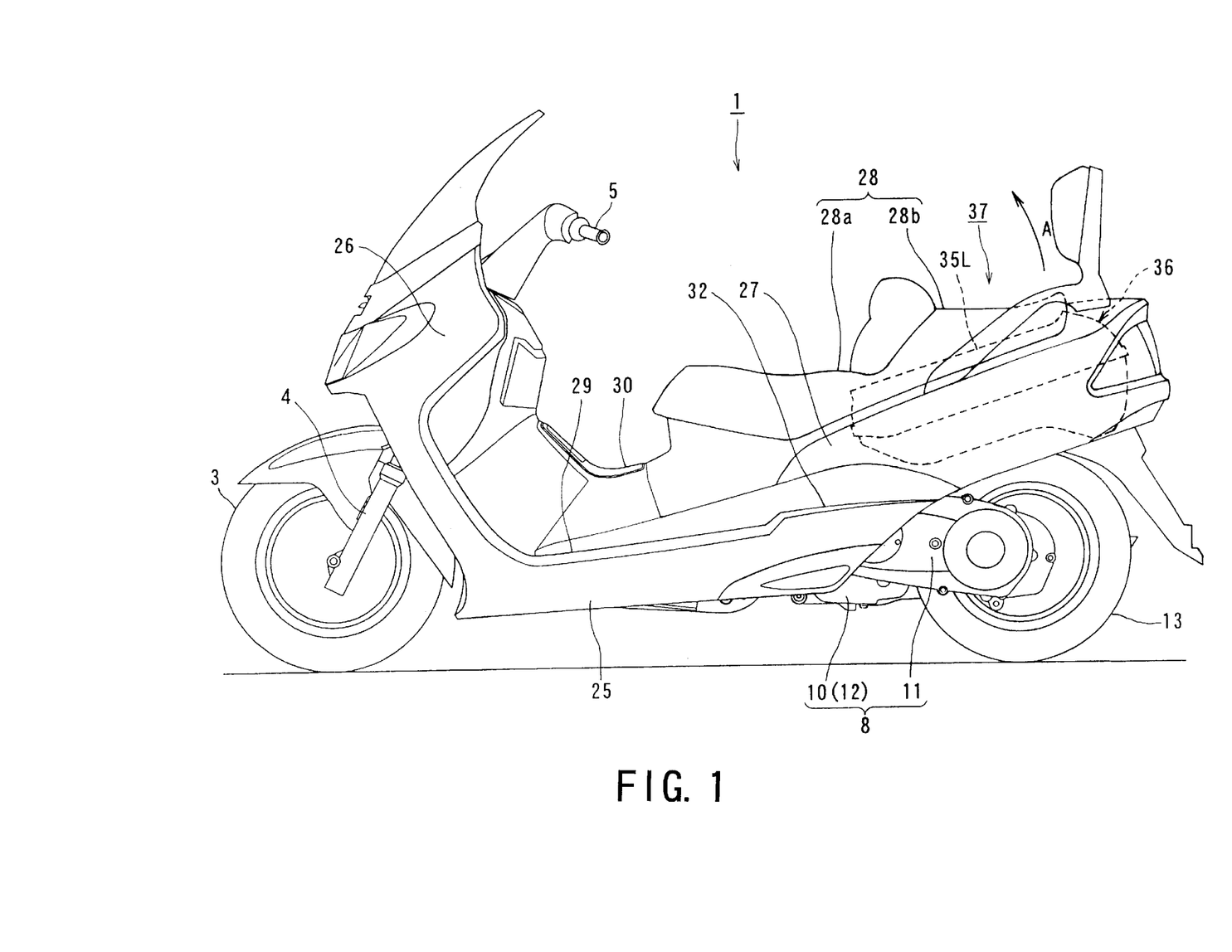
FIG. 1 is a left side elevational view of a scooter type motorcycle to which an article storage device according to the present invention is arranged.
Figure 2:
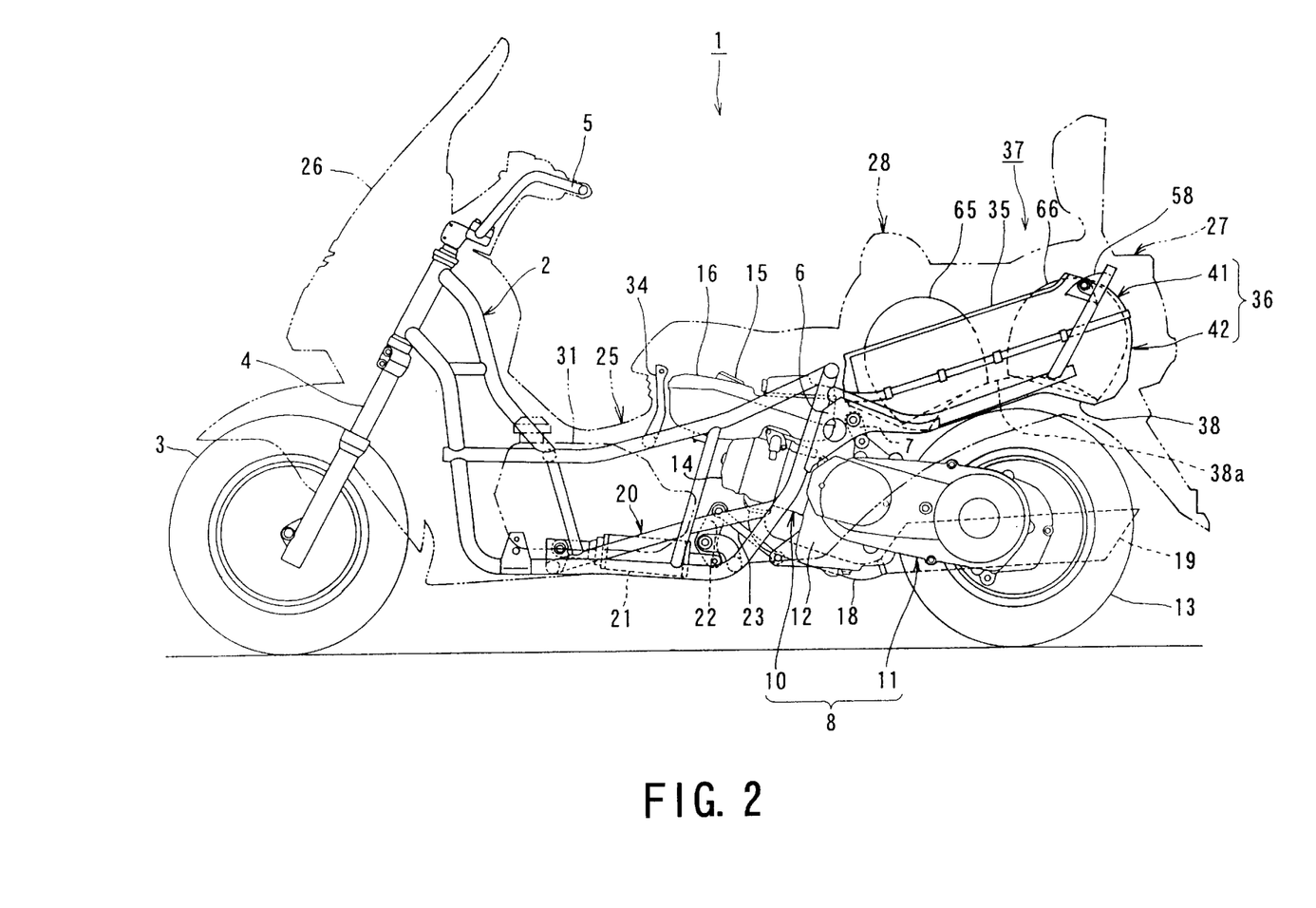
FIG. 2 is also a left side view of the motorcycle of FIG. 1 showing a layout of an interior portion thereof.

With reference to FIGS. 1 and 2, a motorcycle such as a scooter type vehicle 1 is provided with a vehicle body frame 2 made of a steel pipe, and a front fork 4 for holding a front wheel 3 at a front head portion of the vehicle body frame 2 is supported so as to be pivotal in a lateral direction together with a handle bar 5. A power unit 8 is provided for a suspension bracket 6 disposed close to a rear portion of the vehicle body frame 2 through a suspension link 7 so as to be vertically swingable.

The power unit 8 is structured such that an engine 10 and a swing case 11, which are well known for a scooter vehicle, are integrally constructed. For example, the engine 10 is a four-stroke-cycle single-cylinder engine, and a swing case 11 is connected to a left side surface of a crankcase 12 of the engine 10 so as to extend rearward. A rear wheel 13 is pivoted to a right side surface of the rear portion of the vehicle body. A continuously variable transmission unit using a V-belt or a speed reduction transmission unit, an engine starting unit and the like are installed in the swing case 11. Thus, a power of the engine 10 is automatically shifted to be thereby transmitted to the rear wheel 13.

Furthermore, a cylinder 14 substantially horizontally extending forward is provided on a front surface of the crankcase 12 of the engine 10, and a carburetor 15 and an air cleaner 16 are arranged above the cylinder 14. Further, an exhaust pipe 18 extends from a lower surface of the cylinder 14 to a rearward portion, and is connected to an exhaust muffler 19 positioned in a right side of the rear wheel 13.

When the rear wheel 13 is vertically swung due to an unevenness of a road surface or the like at a time when the motorcycle 1 runs, the power unit 8 and all of auxiliary elements or units such as carburetor 15, air cleaner 16, exhaust muffler 19 and the like are integrally swung vertically around the suspension link 7.

A shock absorbing unit 20 of the power unit 8 is arranged in a front below portion of the engine 10 (i.e., cylinder 14), for example, so as to provide a structure in which a front end of a shock absorber 21, which is substantially horizontally placed in a longitudinal direction in a lower portion of the vehicle body frame 2, is pivoted to the vehicle body frame side, a rear end is connected to a power point of a rotating link 22 rotatably pivoted to the vehicle body frame 2, and a point of application of the rotating link 22 is connected to a front surface of the crankcase 12 of the power unit 8 through a connection rod 23. The shock absorber 21 expands and contracts together with a vertical swing motion of the power unit 8 so as to absorb a swinging shock.

An outer periphery of the vehicle body frame 2 is wholly covered by a synthetic resin frame cover 25 to thereby provide a streamlined fairing 26 is formed in the front head portion of the vehicle body, and a rear body 27 is formed in the rear half portion of the vehicle body. A seat 28 is placed above the rear body 27. Further, a portion between the handle bar 5 and the seat 28 is curved downward to be lowered, and a low floor type step-board 29 is provided in this portion. A pair of right and left step-boards 29 are provided so as to step over a middle portion of the vehicle body frame 2, and elements such as a fuel tank 31 and the like are installed within a center console 30 provided therebetween.

The seat 28 includes a rider seat section 28a for a rider and a pillion section 28b for a passenger, which is connected to a rear portion of the rider seat section 28a so as to be one stage higher. Thus, the rider sitting on the rider seat section 28a puts both feet on the step-boards 29, and the passenger sitting on the pillion section 28b puts both feet on a pair of right and left pillion footrests 32. The pillion footrests 32 are integrally provided for the rear body 27 in a shape of being connected to the rear portion of the step-boards 29 so as to be one stage higher.

Further, the seat 28 has a portion near a front end thereof rotatably pivoted to an upper end of a seat bracket 34 protruded from the middle portion of the vehicle body frame 2 and can be flipped up in a direction of an arrow A in FIG. 1 so as to be opened.

The article storage device includes an article storage box 36 formed in a shape of a container with a bottom having an article access port 35 opened upward and arranged below the seat 28 particularly in the rear body 27 below the pillion section 28b, whereby the article storage box 36 is structured so as to take the article in and out the storage box 36 by opening the seat 28.

On the contrary, the carburetor 15 and the air cleaner 16 are laid immediately in front of the storage box 36, and these carburetor 15 and air cleaner 16 can be maintained by opening the seat 28.

Next, with reference to FIGS. 3 to 6, the preferred embodiment of the present invention will be described more in detail.

Further, it is to be first noted that although the article storage device of the present invention has generally box-shaped structure comprising an article storage box 36 as main component, and accordingly, the storage box 36 may be herein referred to equivalently as article storage device.

Figure 3:
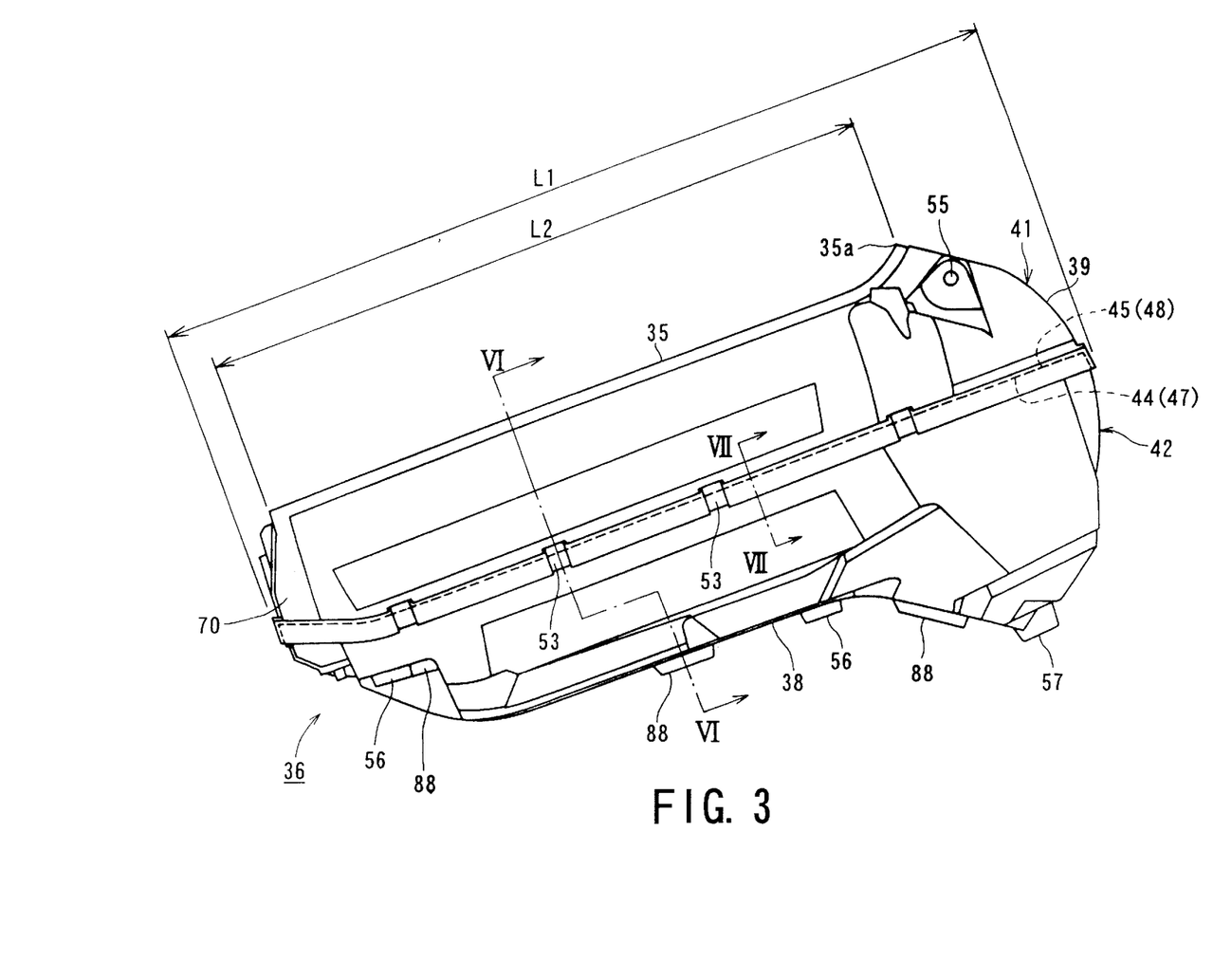
FIG. 3 is a left side view of the article storage device of box structure as a unit.
Figure 4:
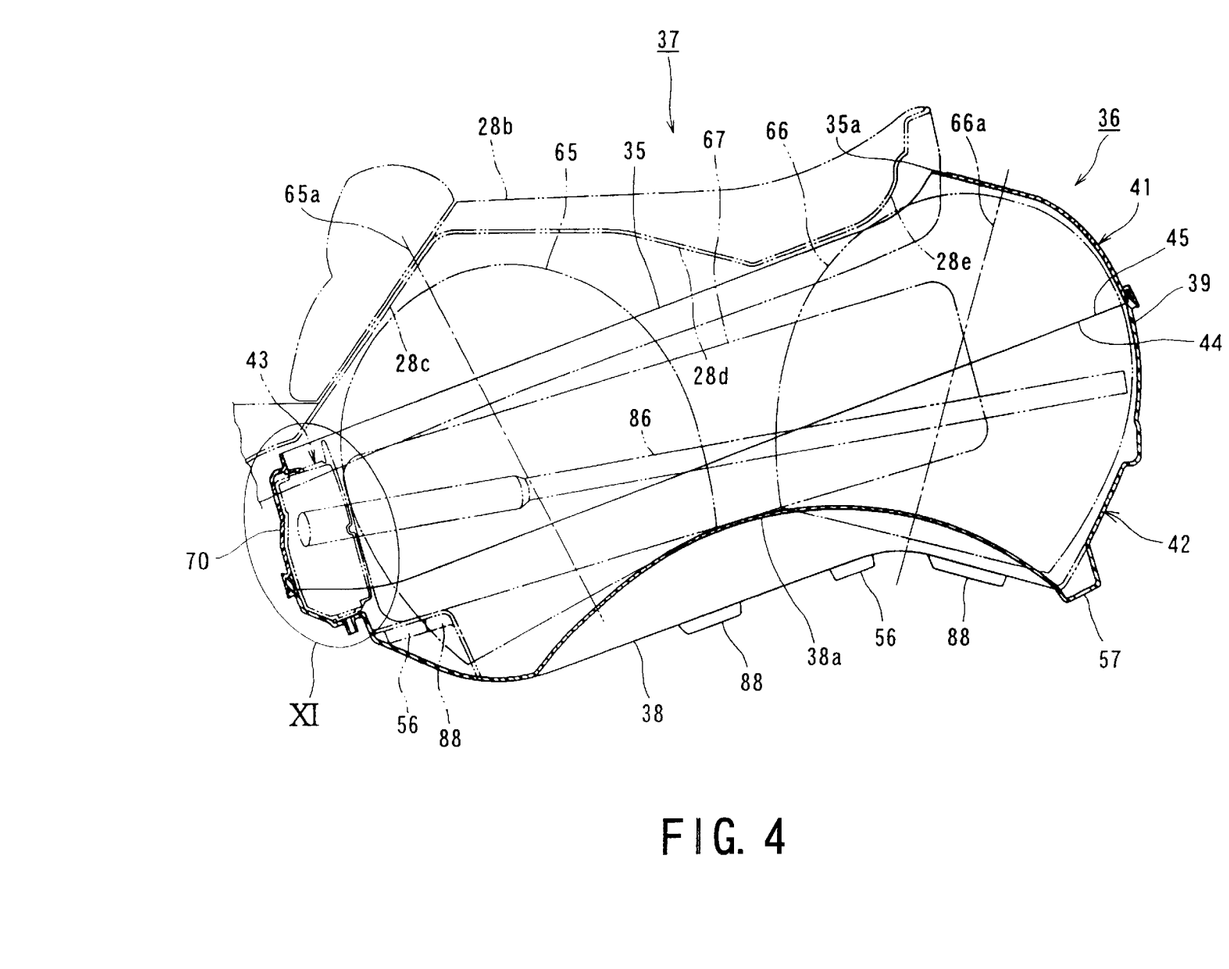
FIG. 4 shows an elevational section of a motorcycle (vehicle) body along a center line of a seat and the storage device in accordance with one embodiment of the present invention.

The storage box 36 is arranged in a rear portion of the vehicle body and above the vertically swingable rear wheel 13, and a recessed portion (shape) 38a protruding upward is provided on a bottom surface 38 so as to prevent the rear wheel 13 from being interfered with the-bottom surface 38 of the storage box 36 at a time when the power unit 8 and the rear wheel 13 are at the uppermost position within the swinging range thereof. Furthermore, the bottom surface 38 is inclined forward downward at a forward portion from the top portion of the recessed portion 38a, and the bottom surface 38 is formed so as to be inclined rearward downward in a rearward portion from the top portion of the recess shape 38a.

Further, the article access port 35 has a rear edge portion 35a positioned rearward from the top portion of the recessed shape 38a, and a rearmost portion of the storage box 36 expands rearward with respect to the position of the rear edge portion 35a to thereby form an expanding portion 39. Due to the formation of the expanding portion 39, it is possible to increase a capacity of the storage box 36 by availably utilizing the dead space in the rear portion of the storage box 36. Further, a longitudinal size of the article access port 35 may not be increased at random.

Figure 5:
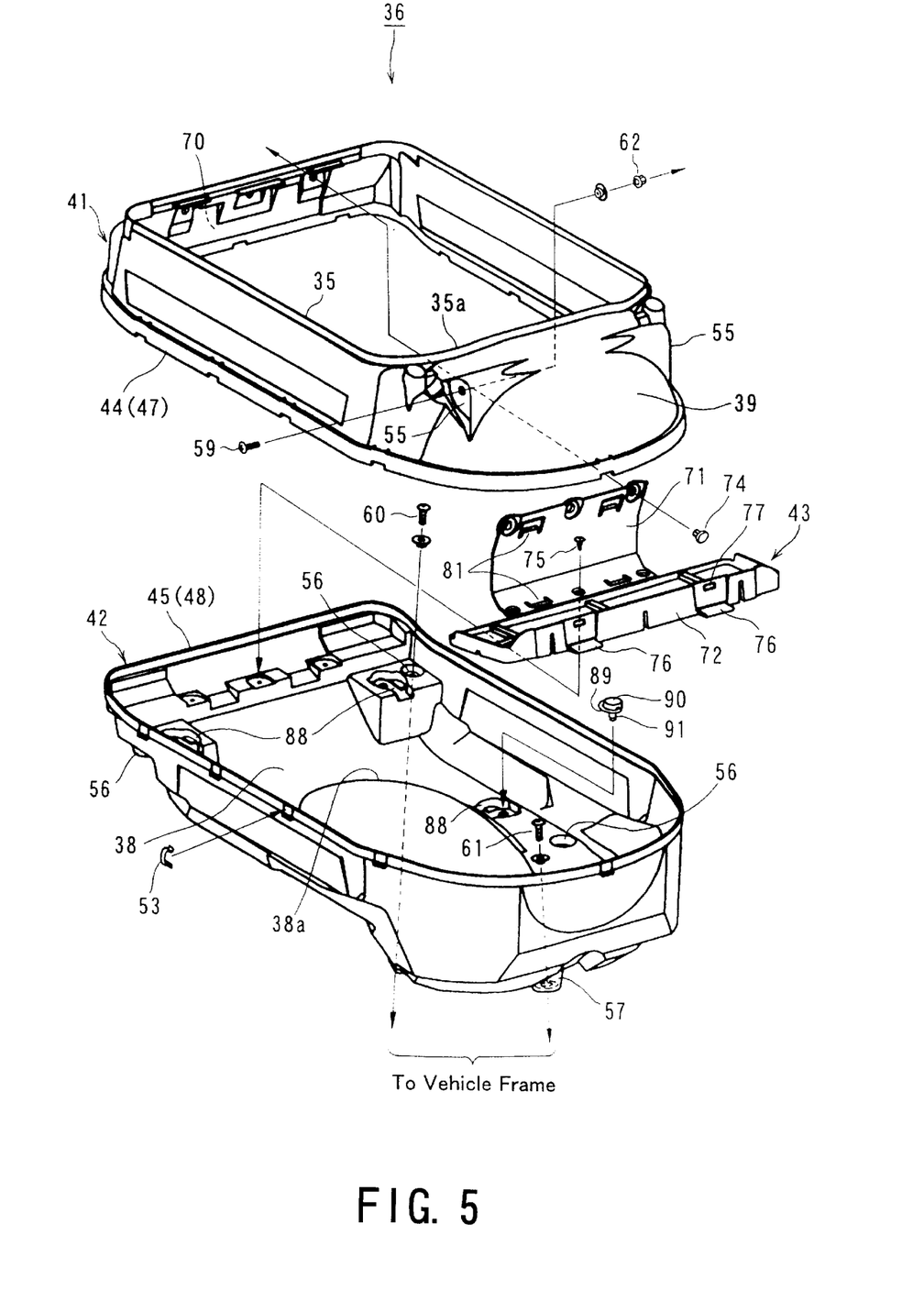
FIG. 5 is an exploded perspective view of the storage device as obliquely seen from a left rear portion.

Further, the storage box 36 is provided with an upper box half body 41 and a lower box half body 42 which are formed by synthetic resin, and a lid unit 43 (described in detail hereinlater) which is separately formed by synthetic resin from the box half bodies 41 and 42. The upper box half body 41 has the article access port 35 and a joint opening portion 44 opened downward so as to be formed in a substantially skirt shape expanding downward towards the joint opening portion 44 from the article access port 35. On the contrary, the lower box half body 42 has the bottom surface 38 and a joint opening portion 45 opened upward so as to be formed in a substantially tray shape expanding upward towards the joint opening portion 45 from the bottom surface 38.

Figure 6:
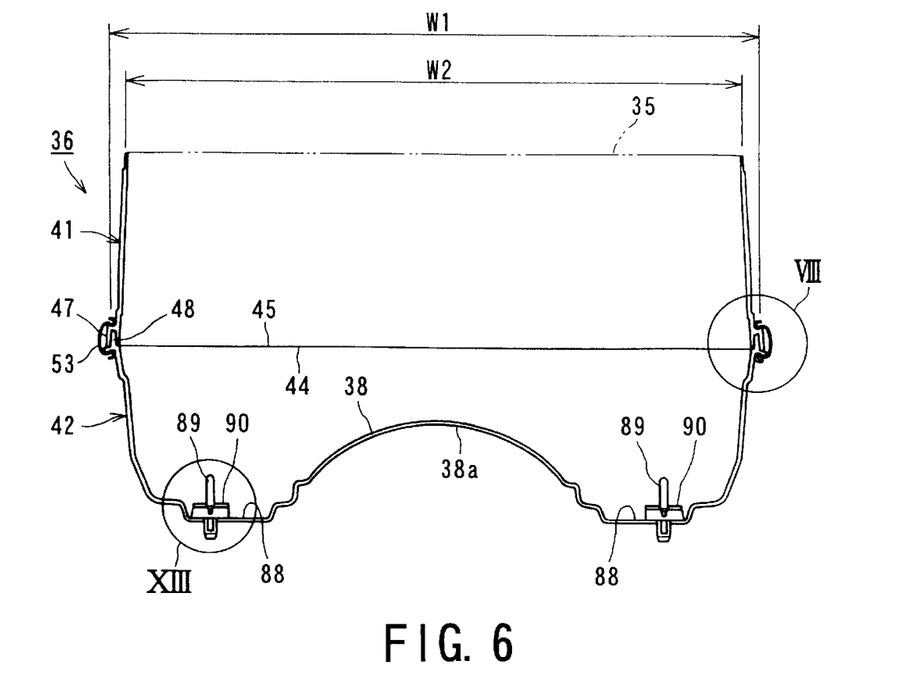
FIG. 6 shows an elevational section taken along the line VI—VI in FIG. 3.

Then, these joint opening portions 44 and 45 of the upper and lower box half bodies 41 and 42 are aligned and bonded with each other. Accordingly, as shown in FIGS. 3 and 6, a length L1 and a width W1 of the joint opening portions 44 and 45 in the upper and lower box half bodies 41 and 42 become larger than a length L2 and a width W2 of the article access port 35, and of course, an opening area of the joint opening portions 44 and 45 becomes larger than an opening area of the article access port 35 and larger than an area of the bottom surface 38.

Figure 7:
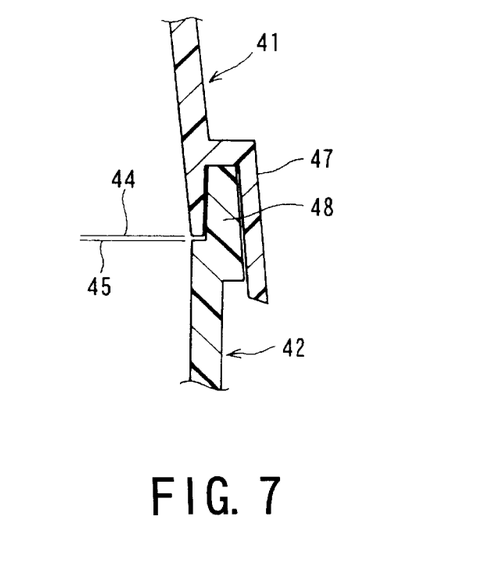
FIG. 7 shows an elevational section taken along the line VII—VII in FIG. 3.

Engaging flanges 47 and 48 protruding at an outer peripheral side are formed all around the periphery of the respective joint opening portions 44 and 45 of the upper and lower box half bodies 41 and 42 such as shown as an enlarged vertical section in FIG. 7. These engaging flanges 47 and 48 are aligned with each other. For example, the upper engaging flange 47 is formed in a substantially "]"-shape in cross section opened downward, and on the contrary, the lower engaging flange 48 is formed as a protrusion in cross section standing up to the above, so that the upper and lower engaging flanges 47 and 48 are fitted to each other and the upper and lower box half bodies 41 and 42 are positioned to each other, thus providing a water-proof structure against waterdrop or the like dropping down from the above.

Figure 8:
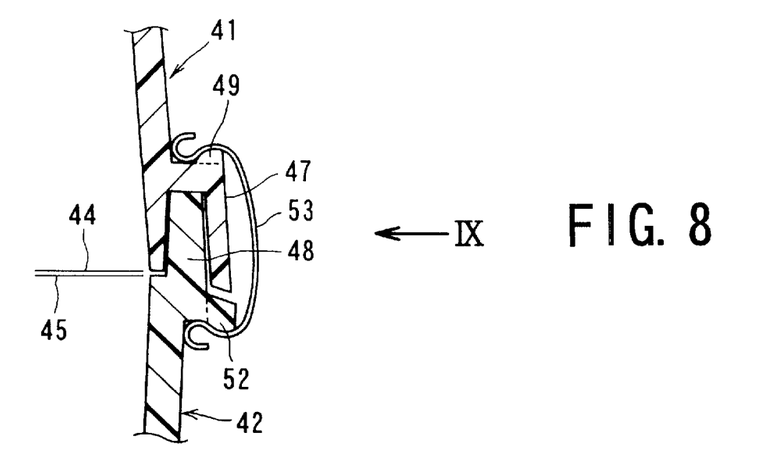
FIG. 8 is an enlarged view of a portion VIII in FIG. 6.
Figure 9:
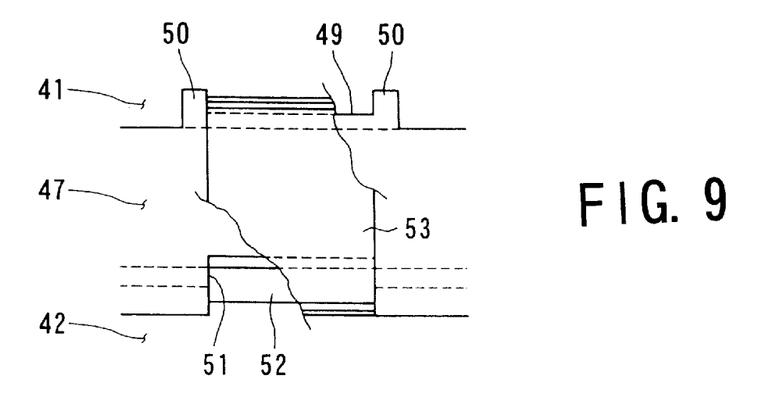
FIG. 9 is a schematic view seen in an arrowhead direction of IX of FIG. 8.

As shown in FIGS. 8 and 9, ten, for example, clamp hooks 49 are formed to the intermediate portion of the upper engaging flange 47 at a predetermined interval, a pair of clamp stoppers 50 are formed in both sides thereof, and a clamp notch 51 is formed in a lower portion of each of the clamp hooks 49. On the contrary, clamp hooks 52 are formed to the lower engaging flange 48 in correspondence to the positions of the clamp hooks 49.

When the upper and lower engaging flanges 47 and 48 are aligned with each other, the clamp hook 52 is fitted to each of the clamp notches 51. A clamp member 53 is fitted to the clamp hook 49 and the clamp hook 52 from an outer peripheral side. The clamp member 53 is formed, for example, by bending a spring steel metal plate in a substantially "C" shape. However, the clamp member 53 may be formed of synthetic resin material or the like.

The clamp member 53 grips and fixes the upper and lower engaging flanges 47 and 48 at portions of the clamp hook 49 and the clamp hook 52, whereby the upper and lower box half bodies 41 and 42 can be integrally and firmly assembled. The clamp member 53 is prevented from laterally shifting by being fitted to a portion between two clamp stoppers 50 and to the clamp notch 51.

Figure 10:
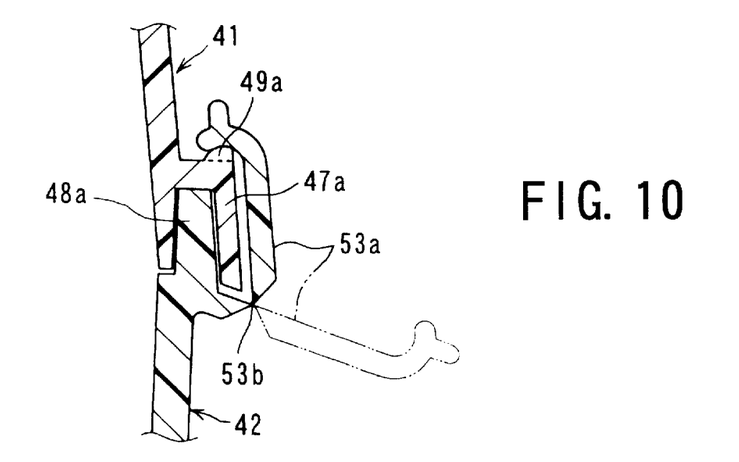
FIG. 10 shows an elevational section of another example of a fitting structure by using a clamp member.

With such arrangement, as shown in FIG. 10. there is provided another example, in which a clamp member 53a is integrally formed in a lower engaging flange 48a (or an upper engaging flange 47a), a connecting portion thereof is made thin so as to form a resin hinge 53b, and the clamp member 53a is bent around the resin hinge 53b to thereby fit the clamp member 53a to the clamp hook 49a of the upper engaging flange 47a. Therefore, as mentioned above, the clamp member 53 (53a) is not necessarily separated from the upper and lower box half bodies 41 and 42.

In this case, as shown in FIGS. 3 to 5, a pair of right and left fastening seats 55 are formed in the rear portion of the upper box half body 41, and on the contrary, a pair of right and left fastening seats 56 are formed in the front portion and the middle portion of the lower box half body 42 (the bottom surface 38), respectively, and one fastening seat 57 is formed in a center of the rear portion. These fastening seats 55, 56 and 57 are fastened and fixed to fastening brackets 58,— (refer to FIG. 1) or the like formed in the vehicle body frame 2 by means of screws 59, 60 and 61 and nuts 62, and the storage box 36 is thereby fixed to the vehicle body frame 2.

As shown in FIG. 4, an interior space of the storage box 36 is separated into a front half portion and a rear half portion with the recessed portion 38a on the bottom surface 38 being the boundary thereof. An interior shape of the front half portion is formed so that a full-faced helmet 65, entirely covering a rider's face, can be accommodated so as to direct a bottom edge portion forward downward in a state of directing a top portion thereof upward, that is, the helmet is directed forward the pillion section 28b in a state that a vertical axis 65a of the helmet 65 is inclined forward, and an interior shape of the rear half portion is formed so that a full-faced helmet 66 can be accommodated so as to direct a bottom edge portion rearward downward in a state of directing a top portion thereof upward, that is, the helmet is directed rearward the pillion section 28b in a state that a vertical axis 66a of the helmet 66 is inclined rearward. In this case, although these two helmets 65 and 66 are both received in a lateral direction, they may be accommodated in a longitudinal direction.

As mentioned above, since the helmet 65 accommodated in the front half portion of the storage box 36 has a forward tilting posture with the bottom edge portion thereof being directed downward, and on the other hand, the helmet 66 accommodated in the rear half portion of the storage box 36 has a backward tilting posture with the bottom edge portion thereof being directed downward, it is possible to effectively prevent both the helmets 65 and 66 from rolling in a longitudinal direction in the storage box 36. Thus, it is possible to improve a sitting feeling and a foot placing property of a passenger by reducing a height of the storage box 36, that is, a height of the pillion section 28b.

Furthermore, a rear edge portion 35a of the article access port 35 is positioned so that at least a front portion of the rear side helmet 66 faces to the external at a time of opening the seat 28, thereby easily taking in and out the helmet 66.

Still furthermore, in a side view, among a front portion 28c, a middle portion 28d and a rear portion 28e of the bottom plate of the pillion section 28b, the height of the middle portion 28d positioned above a valley-like space formed between the front and rear helmets 65 and 66 is made lower than a height of the front portion 28c and the rear portion 28e corresponding to a portion above the top portions or a portion near the front and rear helmets 65 and 66.

As mentioned above, when the middle portion 28d of the bottom plate of the pillion section 28b is recessed into the valley-like space formed between the front and rear helmets 65 and 66, the height of the pillion section 28b can be further reduced, and a cushioning function (thickness) of the pillion section 28b is increased to thereby improve a sitting feeling and a ride quality of the passenger.

Moreover, the upper portion of the rear helmet 66 is pressed by the portion between the middle portion 28d and the rear portion 28e of the bottom plate of the pillion section 28b at a time when the seat 28 is closed. It becomes therefore possible to securely position the rear helmet 66 easily rolling forward in accordance with the rearward downward inclination of the bottom surface 38 of the rear portion in the storage box 36.

According to the article storage device 37 structured in the manner mentioned above, since the article storage box 36 is formed in a shape narrowing towards the bottom surface 38 after the storage box 36 is temporarily expanded longitudinally and laterally towards the below from the article access port 35, no dead space is formed between the article storage device 37 (box body 36) and the frame covers 25 (the rear body 27) attached to both sides of the storage box 36 and in front and at the rear portions thereof, so that the storage box 36 can provide an increased capacity. Accordingly, it is possible to accommodate large article such as two full-faced helmets 65 and 66, a briefcase 67 and the like with keeping a margin, as shown in FIG. 4.

Moreover, according to the described embodiment, since the article access port 35 does not become large at random even in the case of increasing the capacity of the storage box 36, it is possible to prevent the seat 28 arranged near the article access port 35 from becoming large and it is possible to significantly improve a sitting feeling and a foot placing property of the rider, as well as a design characteristic of the motorcycle 1.

In addition, since not only each of the upper and lower box half bodies 41 and 42 constituting the storage box 36 is made compact and a formability is improved, but also the box half bodies 41 and 42 can be piled each other, so that the storage space can be advantageously saved, the transfer efficiency can be improved, and the productivity of the storage box 36 can be widely improved.

Furthermore, since the engaging flanges 47 and 48 formed to the respective joint opening portions 44 and 45 of the upper and lower box half bodies 41 and 42 are aligned so as to be gripped and fixed by the clamp member 53, it becomes possible to make simple a joining structure and a joining operation, for example, in comparison with the case that the upper and lower joint opening portions 44 and 45 are joined to each other in accordance with a bonding, welding, screwing or the like method. It becomes also possible to make the joint portions (the engaging flanges 47 and 48) compact so as to increase the capacity of the storage-box 36.

Still furthermore, since the recessed portion 38a is provided on the bottom surface 38 of the storage box 36, the bottom surface 38 is formed to provide a convex shape towards inside, and the interior portion of the storage box 36 is separated into a front half portion and a rear half portion with the top portion of the recessed portion 38 being the boundary thereof, it is possible to securely prevent the article such as the helmets 65 and 66 respectively accommodated in the front half portion and the rear half portion, the small article and the like from rolling in a longitudinal direction due to the formation of the protruding shape of the recess 38a. Furthermore, since the article access port 35 is opened rearward from the top portion of the recessed shape 38a, it becomes easy to access the article such as the helmet 66 in the rear half portion of the storage box 36.

In such arrangement, as shown in FIGS. 3 to 5, 11 and 12, there is formed a protruding portion 70 protruding forward and extending downward of the rider seat 28a at the front end portion of the storage box 36, and the lid unit 43 is mounted to an inner side of the protruding portion 70. The lid unit 43 is structured such that a fixed plate 71 and a lid 72 are integrally formed of the same synthetic resin material as that of the storage box 36 so as to form a resin hinge 73 by making thin a portion between both the fixed plate 71 and the lid 72.

Figure 11:
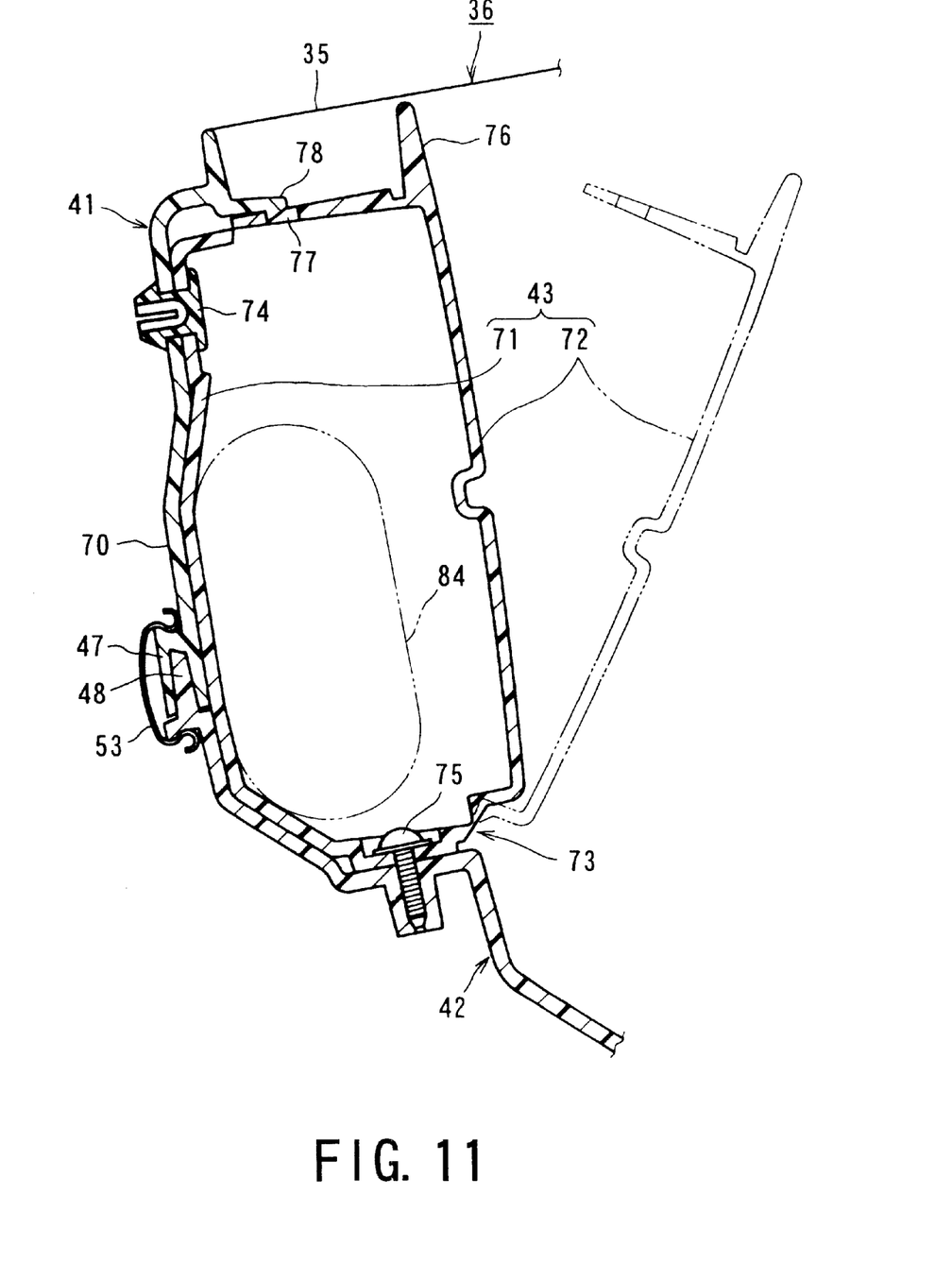
FIG. 11 shows an elevational section of a protruding portion and a lid unit of the storage box in an enlarged scale of the portion XI in FIG. 4.
Figure 12:
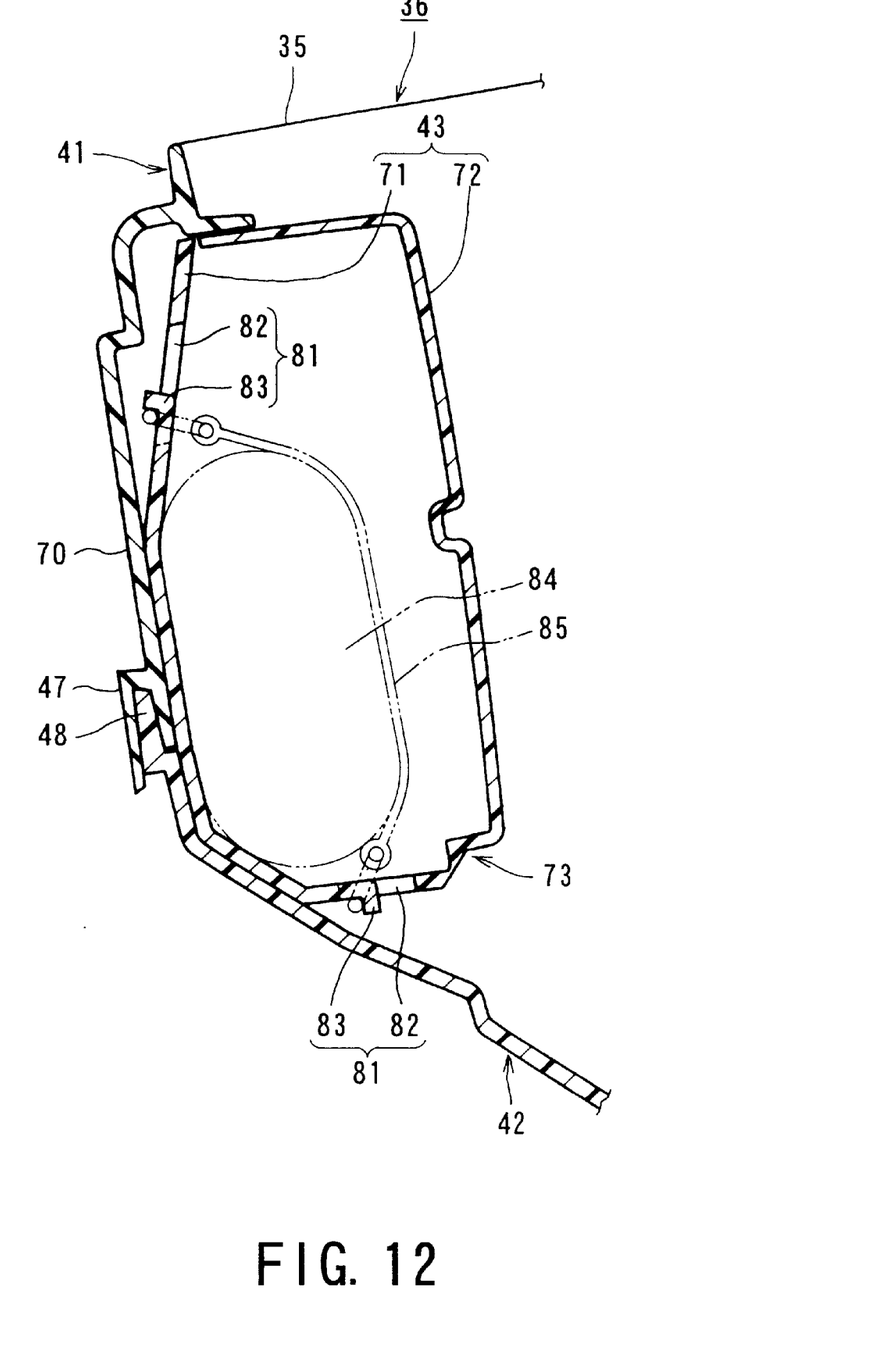
FIG. 12 is an elevational section of the protruding portion and the lid unit of FIG. 11.

The fixed plate 71 of the lid unit 43 is fixed to an upper wall portion (the upper box half body 41) of the protruding portion 70, for example, by three inserting clips 74 and fixed to a lower wall portion (the lower box half body 42) of the protruding portion 70 by means of one screw 75. Further, the lid 72 can be opened and closed about the resin hinge 73 in the lower portion in a direction of opening upward. A pair of right and left switching knobs 76 and an engaging hole 77 are formed in an upper end of the lid 72, and when the lid 72 is closed, the engaging hole 77 is engaged with an engaging hook 78 formed in an upper side of the protruding portion 70 (near the front end portion of the article access port 35) to thereby lock the lid 72. When the lid 72 is closed, the interior space of the protruding portion 70 is separated from the other space in the storage box 36.

Furthermore, a pair of right and left holding portions 81 are integrally formed on the fixed plate 71 side of the lid unit 43. Each of these holding portions 81 is structured, for example, such that a hook shape 83 is formed in a line at which two upper and lower punching holes 82 are close to each other. The small article 84 can be stably fixed to the inner portion of the protruding portion 70 by placing the small article 84 such as in-vehicle tools between the holding portions 81 (the hook shaped 83) and engaging a rubber band 85 with each of the holding portions 81 (83).

By providing the protruding portion 70 in the front portion of the storage box 36 so as to be separated by the lid 72 in the manner mentioned above, the dead space, in the conventional structure, such as the space below the rider seat section 28a and the space in front of the storage box 36 can be replaced with the protruding portion 70 so as to make it possible to hold the small article in the protruding portion 70 and prevent the small article from rolling. Further, when the lid 72 is opened, it is possible to easily accommodate a long article such as tennis racket 86 (refer to FIG. 4), umbrella or the like.

Furthermore, since the lid unit 43 is separately provided from the storage box 36 and the holding portion 81 is integrally formed with the lid unit 43, a formability of the storage box 36 (the upper and lower box half bodies 41 and 42) can be improved in comparison with the case that the lid unit 43 and the holding portion 81 are integrally formed with the storage box 36, and the storage box 36 can be easily assembled.

On the contrary, as shown in FIGS. 3 to 6, 13 and 14, a pair of right and left hook storage recess portions 88 are respectively provided on the bottom surface 38 of the storage box 36 (the lower box half body 42), for example, in a front portion, a middle portion and a rear portion thereof, and hooks 89 are respectively placed within these six hook storage recess portions 88. Each of the hooks 89 is formed, for example, in a D-shaped annular portion and is pivotally or rotatably provided in a hook boss 90. An inserting clip 91 in a lower portion of the hook boss 90 is inserted into a through hole 88b on a bottom surface 88a of the hook storage portion 88 so as to be fixed.

Figure 13:
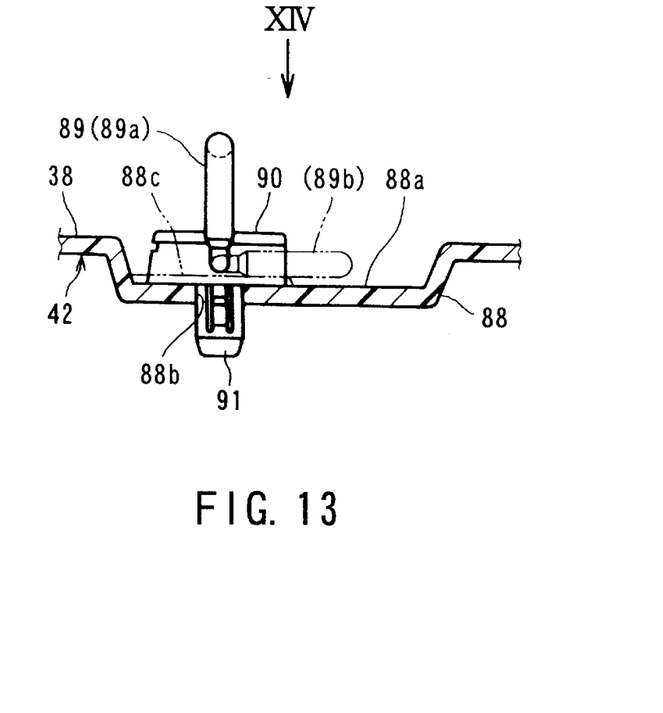
FIG. 13 is an enlarged view of a portion XIII in FIG. 6.
Figure 14:
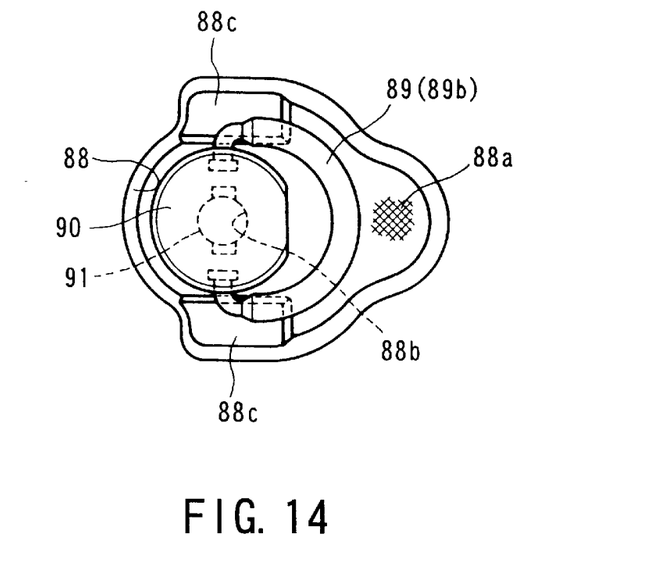
FIG. 14 is a schematic view seen from an arrowhead direction XIV in FIG. 13.

Each of the hooks 89 is made retractable to be rotatable between an upright position 89a and a tilt-down position 89b in the hook storage recess portion 88. The hook 89 largely protrudes from the bottom surface 38 of the storage box 36 at the upright position 89a, and the hook 89 goes down below the bottom surface 38 at the tilt-down position 89b.

The location of the hook 89 mentioned above makes it possible to easily fasten and fix the article accommodated in the storage box 36 by using a rope, a net or the like, and since the hook 89 does not protrude from the bottom surface 38 of the storage box 36 by tilting down the hook 89 to the tilt-down position 89b at a time when the hook 89 is not used, there is no fear that the hook 89 gets in the way and the article in the storage box may be damaged.

Furthermore, it is possible to make shallow a depth of the hook storage recess portion 88 by making the hook 89 retractable, thus relatively reducing the height of the bottom surface 38 of the storage box 36 as much as possible and, hence, increasing the capacity of the storage box 36.

Still furthermore, one stage higher step portions 88c are respectively formed in both sides of the through hole 88b on the bottom surface 88a of the hook storage recess portion 88, and the hook 89 reclined to the tilt-down position 89b rides on the step portion 88c so as to slightly float up. Accordingly, the user can easily pull up the hook 89.

It is further to be noted that the present invention is not limited to the described embodiment and many other changes, modifications and alternations may be made without departing from the scopes of the appended claims.

That is, for example, in the described embodiment, although the structure of the article storage device 37 or box 36 is applied to the scooter type motorcycle, the structure of the article storage device of the present invention may be applicable to the other type of motorcycles or other like vehicle.

What is claimed is:

1. An article storage device of a motorcycle in which a seat member includes a rider seat section and a pillion section which is disposed on and continuous with a rear portion of the rider seat section, the pillion section having an uppermost portion which is positioned at a higher elevation than an uppermost portion of the rider seat section so that the seat member forms a staged structure, and the article storage device being arranged substantially below the pillion section of the seat member and having a front end portion positioned at the rear portion of the rider seat section, the article storage device comprising:

an article storage box constituting a body of the article storage device, the article storage box being disposed below the seat member, the article storage box being arranged in a rear portion of a vehicle body of the motorcycle and above a rear wheel of the motorcycle, and the article storage box having a rear side portion having a depth which is deeper than a depth of a front side portion of the article storage box so that the depth of the rear side portion of the article storage box is sufficient to accommodate a rear side full-faced helmet in a substantially upright position in the article storage box; and an article access port formed in an upper portion of the article storage box, the article access port being open upwardly when the article storage box is installed in a vehicle body of the motorcycle, the article access port being opened and closed by opening and closing the seat member, respectively;

a recessed portion protruding upwardly from a central portion of a bottom surface of the article storage box for preventing interference of the article storage box with the rear wheel of the motorcycle, the bottom surface of the article storage box having a front portion in front of a top portion of the recessed portion such that the front portion is inclined forwardly and downwardly, the bottom surface of the article storage box also having a rear portion at a rear of the top portion of the recessed portion such that the rear portion is inclined rearwardly and downwardly, and the article access port has a rear edge portion positioned at the rear of the top portion of the recessed portion.

2. The article storage device of a motorcycle according to claim 1, wherein the article storage box includes upper and lower box half bodies each having joint opening portions, the joint opening portions being formed with upper and lower engaging flanges so as to protrude outwardly of outer peripheral sides of the upper and lower box half bodies, respectively, and the upper and lower box half bodies being integrally assembled by mating and joining the upper and lower engaging flanges to each other and then gripping and fixing the upper and lower engaging flanges from the outer peripheral sides of the upper and lower box half bodies via a clamp member.

3. The article storage device of a motorcycle according to claim 1, further comprising:
   a protruding portion formed on a front end portion of the article storage box so as to extend downwardly of the rider seat section; and
   a lid member for separating a first interior space of the protruding portion from a second interior space in the article storage box, the lid member being formed therein so as to be opened and closed.

4. The article storage device of a motorcycle according to claim 3, wherein the lid member is provided to be independent from the article storage box, the lid member having an article holding portion integrally formed therewith, and the article holding portion being for holding an article in the protruding portion of the article storage box.

5. The article storage device of a motorcycle according to claim 1, wherein the article storage box is formed with an expanded portion at a rearmost portion of the article storage box in a longitudinal direction thereof so as to protrude outside of the rear edge portion of the article access port.

6. The article storage device of a motorcycle according to claim 1, wherein an interior of the article storage box is divided into a front half portion and a rear half portion so as to accommodate a front side full-faced helmet and the rear side full-faced helmet, respectively, in a state in which top rounded portions of both the front and rear full-faced helmets are directed upwardly, and an upper portion of at least the rear side full-faced helmet is pressed upon by a bottom plate of the seat member.

7. The article storage device of a motorcycle according to claim 1, wherein an interior of the article storage box is divided into a front half portion and a rear half portion so as to accommodate a front side full-faced helmet and the rear side full-faced helmet, respectively, in a state in which top rounded portions of both the front and rear side full-faced helmets are directed upwardly, the front and rear side full-faced helmets are defined in attitudes so that the front side full-faced helmet is directed forwardly of the pillion section in a state that a vertical axis thereof is inclined forwardly and the rear side full-faced helmet is directed rearwardly of the pillion section in a state that a vertical axis thereof is inclined rearwardly, and a height of a portion of the pillion section corresponding to a portion above a valley-like space formed between the front and rear side full-faced helmets in a side view of a bottom plate of the pillion section is made lower than a height of the front and rear side full-faced helmets.

8. The article storage device of a motorcycle according to claim 1, further comprising a plurality of hook accommodation recesses for accommodating hooks which are formed in a bottom surface of the article storage box, the hooks being placed in the hook accommodation recesses, and a height of the hooks being equal to or lower than a height of the bottom surface of the article storage box.

9. The article storage device of a motorcycle according to claim 1, wherein the hooks are provided so as to be rotatable between an upright position and a tilted-down position thereof in the hook accommodation recess, to protrude from the bottom surface of the article storage box when in the upright position, and to retract below the bottom surface of the article storage box when in the tilted-down position.

10. An article storage device of a motorcycle in which a seat member includes a rider seat section and a pillion section which is disposed on and continuous with a rear portion of the rider seat section, the pillion section having an uppermost portion which is positioned at a higher elevation than an uppermost portion of the rider seat section so that the seat member forms a staged structure, and the article storage device being arranged substantially below the pillion section of the seat member and having a front end portion positioned at the rear portion of the rider seat section, the article storage device comprising:
   an article storage box constituting a body of the article storage device, the article storage box being disposed below the seat member, and the article storage box having a rear side portion having a depth which is deeper than a depth of a front side portion of the article storage box so that the depth of the rear side portion of the article storage box is sufficient to accommodate a rear side full-faced helmet in a substantially upright position in the article storage box; and
   an article access port formed in an upper portion of the article storage box and open upwardly in an installed state of the article storage box, the article access port being opened and closed by opening and closing the seat member, respectively,
   wherein said article storage box has an inner shape so that a front side full-faced helmet and the rear side full-faced helmet are longitudinally arranged in a state such that upper portions of both the front and rear side full-face helmets are directed upwardly, the front and rear side full-faced helmets are accommodated so that a bottom edge portion of the front side full-faced helmet is directed forwardly and downwardly and a bottom edge of the rear side full-faced helmet is directed rearwardly and downwardly, and the rear edge portion of the article access port is positioned so that at least a front portion of the rear side full-faced helmet faces an external portion of the article storage box.

11. The article storage device of a motorcycle according to claim 10, wherein the article storage box includes upper and lower box half bodies each having joint opening portions, the joint opening portions being formed with upper and lower engaging flanges so as to protrude outwardly of outer peripheral sides of the upper and lower box half bodies, respectively, and the upper and lower box half bodies being integrally assembled by mating and joining the upper and lower engaging flanges to each other and then gripping and fixing the upper and lower engaging flanges from the outer peripheral sides of the upper and lower box half bodies via a clamp member.

12. The article storage device of a motorcycle according to claim 10, further comprising:
   a protruding portion formed on a front end portion of the article storage box so as to extend downwardly of the rider seat section; and
   a lid member for separating a first interior space of the protruding portion from a second interior space in the article storage box, the lid member being formed therein so as to be opened and closed.

13. The article storage device of a motorcycle according to claim 12, wherein the lid member is provided to be independent from the article storage box, the lid member having an article holding portion integrally formed therewith, and the article holding portion being for holding an article in the protruding portion of the article storage box.

14. The article storage device of a motorcycle according to claim 10, wherein the article storage box is formed with an expanded portion at a rearmost portion of the article storage box in a longitudinal direction thereof so as to protrude outside of the rear edge portion of the article access port.

15. The article storage device of a motorcycle according to claim 10, wherein an interior of the article storage box is divided into a front half portion and a rear half portion so as to accommodate the front side full-faced helmet and the rear side full-faced helmet, respectively, in a state in which top rounded portions of both the front and rear full-faced helmets are directed upwardly, and an upper portion of at least the rear side full-faced helmet is pressed upon by a bottom plate of the seat member.

16. The article storage device of a motorcycle according to claim 10, wherein an interior of the article storage box is divided into a front half portion and a rear half portion so as to accommodate the front side full-faced helmet and the rear side full-faced helmet, respectively, in a state in which top rounded portions of both the front and rear side full-faced helmets are directed upwardly, the front and rear side full-faced helmets are defined in attitudes so that the front side full-faced helmet is directed forwardly of the pillion section in a state that a vertical axis thereof is inclined forwardly and the rear side full-faced helmet is directed rearwardly of the pillion section in a state that a vertical axis thereof is inclined rearwardly, and a height of a portion of the pillion section corresponding to a portion above a valley-like space formed between the front and rear side full-faced helmets in a side view of a bottom plate of the pillion section is made lower than a height of the front and rear side full-faced helmets.

17. The article storage device of a motorcycle according to claim 10, further comprising a plurality of hook accommodation recesses for accommodating hooks which are formed in a bottom surface of the article storage box, the hooks being placed in the hook accommodation recesses, and a height of the hooks being equal to or lower than a height of the bottom surface of the article storage box.

18. The article storage device of a motorcycle according to claim 17, wherein the hooks are provided so as to be rotatable between an upright position and a tilted-down position thereof in the hook accommodation recess, to protrude from the bottom surface of the article storage box when in the upright position, and to retract below the bottom surface of the article storage box when in the tilted-down position.

19. An article storage device of a motorcycle in which a seat member includes a rider seat section and a pillion section which is disposed on and continuous with a rear portion of the rider seat section, the pillion section having an uppermost portion which is positioned at a higher elevation than an uppermost portion of the rider seat section so that the seat member forms a staged structure, and the article storage device being arranged substantially below the pillion section of the seat member and having a front end portion positioned at the rear portion of the rider seat section, the article storage device comprising:
   an article storage box constituting a body of the article storage device, the article storage box being disposed below the seat member, and the article storage box having a rear side portion having a depth which is deeper than a depth of a front side portion of the article storage box so that the depth of the rear side portion of the article storage box is sufficient to accommodate a rear side full-faced helmet in a substantially upright position in the article storage box; and
   an article access port formed in an upper portion of the article storage box and open upwardly in an installed state of the article storage box, the article access port being opened and closed by opening and closing the seat member, respectively,
   wherein the article storage box comprises an upper box half body having the article access port and a joint opening portion opened downwardly and a lower box half body having a bottom surface and a joint opening portion opened upwardly, the joint opening portions of the upper and lower box half bodies being aligned and joined with each other, the upper box half body being formed in a shape expanding downwardly towards the joint opening portions from the article access port, the lower box half body being formed in a shape expanding upwardly towards the joint opening portion from the bottom surface, and an opening area of each of the joint opening portions is made larger than an opening area of the article access port and an area of the bottom surface of the article storage box.

20. The article storage device of a motorcycle according to claim 19, wherein the joint opening portions are formed with upper and lower engaging flanges so as to protrude outwardly of outer peripheral sides of the upper and lower box half bodies, respectively, and the upper and lower box half bodies are integrally assembled by mating and joining the upper and lower engaging flanges to each other and then gripping and fixing the upper and lower engaging flanges from the outer peripheral sides of the upper and lower box half bodies via a clamp member.

21. The article storage device of a motorcycle according to claim 19, further comprising:
   a protruding portion formed on a front end portion of the article storage box so as to extend downwardly of the rider seat section; and
   a lid member for separating a first interior space of the protruding portion from a second interior space in the article storage box, the lid member being formed therein so as to be opened and closed.

22. The article storage device of a motorcycle according to claim 21, wherein the lid member is provided to be independent from the article storage box, the lid member having an article holding portion integrally formed therewith, and the article holding portion being for holding an article in the protruding portion of the article storage box.

23. The article storage device of a motorcycle according to claim 19, wherein the article storage box is formed with an expanded portion at a rearmost portion of the article storage box in a longitudinal direction thereof so as to protrude outside of the rear edge portion of the article access port.

24. The article storage device of a motorcycle according to claim 19, wherein an interior of the article storage box is divided into a front half portion and a rear half portion so as to accommodate a front side full-faced helmet and the rear side full-faced helmet, respectively, in a state in which top rounded portions of both the front and rear full-faced helmets are directed upwardly, and an upper portion of at least the rear side full-faced helmet is pressed upon by a bottom plate of the seat member.

25. The article storage device of a motorcycle according to claim 19, wherein an interior of the article storage box is divided into a front half portion and a rear half portion so as to accommodate a front side full-faced helmet and the rear side full-faced helmet, respectively, in a state in which top rounded portions of both the front and rear side full-faced helmets are directed upwardly, the front and rear side full-faced helmets are defined in attitudes so that the front side full-faced helmet is directed forwardly of the pillion section in a state that a vertical axis thereof is inclined forwardly and the rear side full-faced helmet is directed rearwardly of the pillion section in a state that a vertical axis thereof is inclined rearwardly, and a height of a portion of the pillion section corresponding to a portion above a valley-like space formed between the front and rear side full-faced helmets in a side view of a bottom plate of the pillion section is made lower than a height of the front and rear side full-faced helmets.

26. The article storage device of a motorcycle according to claim 19, further comprising a plurality of hook accommodation recesses for accommodating hooks which are formed in a bottom surface of the article storage box, the hooks being placed in the hook accommodation recesses, and a height of the hooks being equal to or lower than a height of the bottom surface of the article storage box.

27. The article storage device of a motorcycle according to claim 26, wherein the hooks are provided so as to be rotatable between an upright position and a tilted-down position thereof in the hook accommodation recess, to protrude from the bottom surface of the article storage box when in the upright position, and to retract below the bottom surface of the article storage box when in the tilted-down position.

* * * * *